Oct. 8, 1968   R. J. DALEY ET AL   3,405,295
THRUST BEARING AND SEAL ASSEMBLY
Filed Nov. 14, 1966   2 Sheets-Sheet 1

INVENTORS
ROGER J. DALEY
WILFRED W. HERDERHORST
BY

ATTORNEYS

INVENTORS
ROGER J. DALEY
WILFRED W. HERDERHORST
ATTORNEYS

United States Patent Office 3,405,295
Patented Oct. 8, 1968

3,405,295
THRUST BEARING AND SEAL ASSEMBLY
Roger J. Daley and Wilfred W. Herderhorst, Fort Wayne, Ind., assignors to Tokheim Corporation, Fort Wayne, Ind., a corporation of Indiana
Filed Nov. 14, 1966, Ser. No. 594,236
7 Claims. (Cl. 310—104)

This invention relates to a thrust bearing assembly for use in adverse bearing environments, such as in a motor pump or the like which operates in a liquid fuel such as gasoline or other solvent liquid having little or no lubricating properties, and to a combination of such thrust bearing assembly with, and to take the thrust of, a magnetic coupling operating through a nonmagnetic imperforate wall.

Hudson U.S. Patent No. 2,885,126 and Wright and Clymer U.S. Patent No. 2,969,741 disclose a motor-pump unit adapted to be mounted in the fuel tank for an internal combustion engine and to pump the gasoline or other fuel from that tank for use by the engine. The pump is a small centrifugal pump having one or more inlet openings openly exposed to the fuel in the tank, and is driven by an hermetically sealed motor enclosed in a sheet metal housing, with the drive transmitted to the pump by a magnetic coupling acting through an end wall of the housing and consisting of a pair of circular permanent magnets on opposite sides of such wall and magnetically coupled through that wall. It is an advantage of such a motor pump unit that its motor is hermetically sealed and its pump is in open communication with the fuel, as is more fully explained in the aforesaid patents. However, the conditions of operation in gasoline or other solvent liquid create a difficult thrust bearing problem in the bearings which sustain the tractive force which is necessarily present between the magnets of the magnetic coupling. The structure requires a simple, low-friction thrust bearing which must operate in the presence of the gasoline or other fuel which has no lubricating properties of its own and which tends to dissolve and wash away any lubricant provided to the exposed thrust bearing. The companion bearing at the bottom of the sealed motor housing presents similar difficulties, for heating and centrifugal force tend to drain and carry away any lubricant provided. Moreover, service requirements can be severe, since motor pump units of this character may be required to withstand temperature variations from −65° to +300° F., and must have a relatively long life, for example, to withstand a life test of 3,000 hours duration.

It is the general object of this invention to provide an improved thrust bearing and seal assembly which is especially adapted for use in a motor pump unit of the character described and is adapted to operate in gasoline or other liquid fuels having solvent properties; to provide such a bearing and seal construction which will contain a supply of lubricant and protect it from contact with the solvent liquid, and will maintain lubricant in contact with the bearing surfaces for a prolonged period and which will effectively distribute onto such surface a lubricant component such as molybdenum disulfide which has the property of "plating" a lubricating coating on the bearing surfaces to maintain lubrication after the initial lubricant supply has been dissipated.

In accordance with the invention, the thrust bearing comprises a single bearing ball mounted substantially on the axis of rotation between a rotary thrust face and a relatively fixed thrust face, in opposed relation, to transmit thrust between such faces. The ball is housed within a retaining chamber defined axially by one of such thrust faces and defined peripherally by a retaining wall which provides a small radial clearance sufficient to allow the ball to take a slightly eccentric position relative to the axis of rotation so that it will roll in a confined path between the thrust faces. The ball chamber extends toward the opposite thrust face and its open end is closed by a flexible lubricant-retaining washer which has a central aperture exposing the bearing area of the ball for engagement with the opposed thrust face. The aperture is surrounded by a central or inner peripheral portion of the washer which is shaped to make conforming engagement with the surface of the bearing ball over an area closely surrounding the exposed bearing area, and the inner edge of the lubricant-retaining washer is substantially confined between the ball surface and the opposed thrust surface. The lubricant-retaining washer is preferably made of a self-sustaining gasket material of either natural or synthetic origin which is inert to the liquid and the grease and which under the operating conditions provides a conformable, low-friction wall which will retain the grease and exclude the solvent liquid.

The accompanying drawings illustrate the invention, and show a preferred embodiment. In such drawing.

Figure 1:
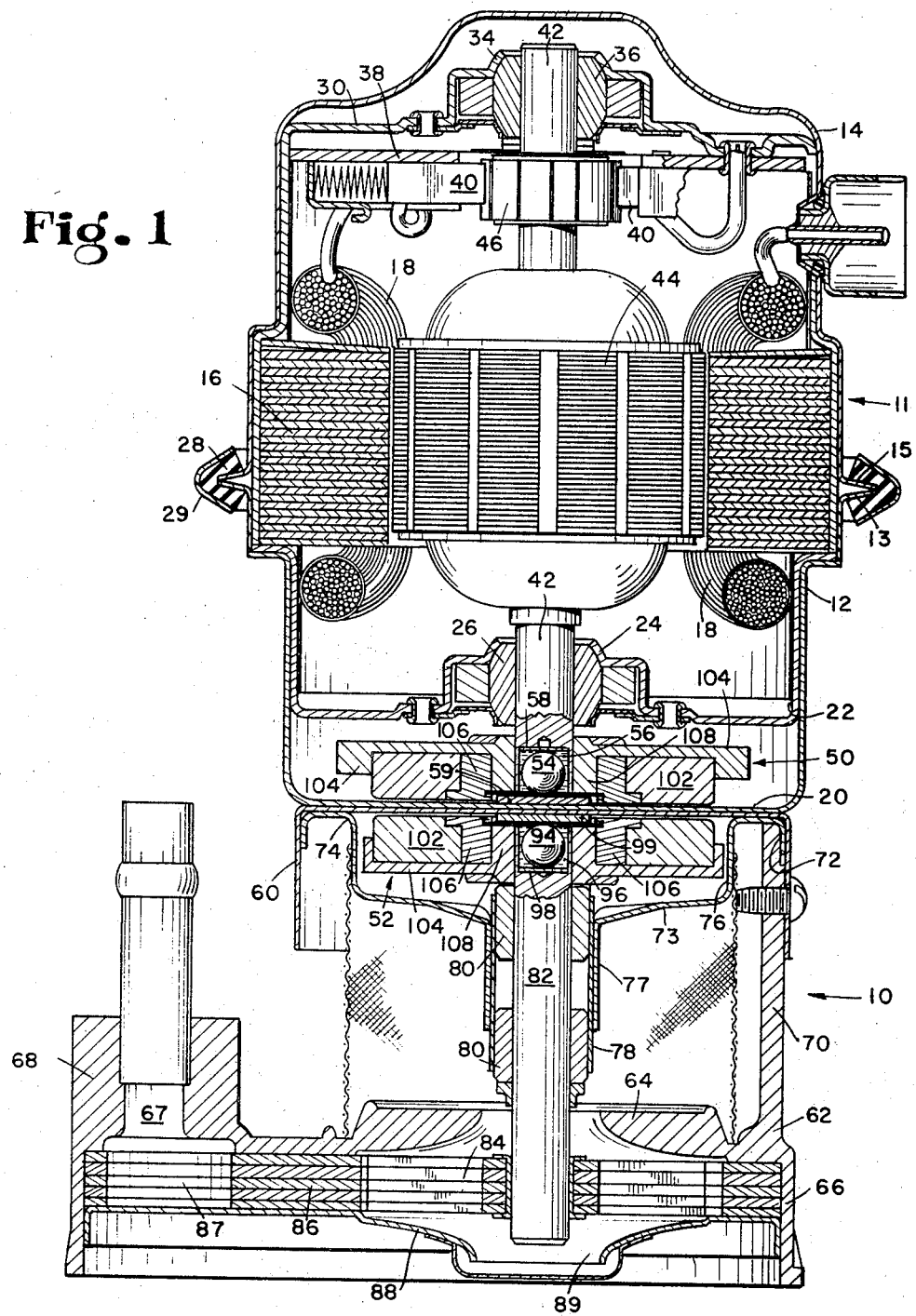
FIG. 1 is a longitudinal sectional view of a pump-motor unit containing bearing assemblies in accordance with the invention both at the upper end of the pump shaft and at the lower end of the motor shaft.

The motor and pump unit shown in FIG. 1 comprises a pump assembly 10 mounted at the lower end of a sealed motor assembly 11.

The motor assembly 11 comprises a casing formed by two hat-shaped shells 12 and 14 which support and enclose a stator core 16 and stator windings 18. The bottom of the shell 12 forms an imperforate wall 20 and supports a cup-shaped bearing carrier 22 which forms a mounting 24 for a lower sleeve bearing 26 for the motor. An upper cup-shaped frame member 30 forms a mounting 34 for an upper sleeve bearing 36 and supports a brush plate 38 which carries brushes 40 for the motor. A motor shaft 42 mounted in the sleeve bearings 26 and 36 carries an armature 44 and a commutator 46. The lower end of the motor shaft 42 carries the driving member 50 of a magnetic coupling, which is magnetically coupled through the wall 20 to a driven coupling member 52 described below. The downward thrust of the motor shaft 42 is taken by a thrust bearing ball 54 mounted in a cavity 56 in the lower end of the shaft 42, and acting between a thrust surface formed by a pad 58 in the bottom of such cavity and a thrust surface formed by a steel disc 59 mounted on the upper surface of the imperforate wall 20.

The two hat-shaped shells 12 and 14 of the motor housing carry narrow radial flanges 13 and 15 at their adjoining edges, and these are welded together to secure the motor in assembled relation and to close the housing. The circumferential rib formed by the welded-together flanges 13 and 15 may be used to mount the motor and pump unit, and to this end, is received in a resilient mounting gasket 28 held by a mounting collar 29.

The lower end wall 20 of the motor assembly carries a downwardly open cupped member 60 whose radial bottom wall is laminated to the end wall 20 of the motor shell 12, and whose side wall forms a mounting for the pump assembly.

The pump assembly comprises a casting 62 which forms the top or upper end wall 64 of the pump, a depending outer wall or skirt 66 for the pump body, an outlet boss 68 for the pump, and four angularly spaced posts 70 by which the pump body may be held in spaced assembled relation with the motor subassembly 11.

The upper ends of the four posts 70 are received in a downwardly open annular channel section 72 of a sheet metal housing 74 for the pump bearing and the driven magnet 52. The inner wall 76 of such channel section 72 merges at its lower edge with an inward radial wall 73 which is joined at its inner edge to a depending sleeve 77. A bearing sleeve 78 containing a pair of spaced bearings 80 is pressed in the sleeve 77. The channel 72 of the housing 74 fits snugly on the upper ends of the posts 70, and positions the bearings 80 on the axis of the pump. A pump shaft 82 is journaled in the bearings 80 and carries at its lower end a pump rotor 84. This is made up of a plurality of laminations, and the pump chamber is defined by a corresponding number of laminations 86 received within the depending wall 66 of the pump casting. The laminations 86 also define a pump outlet passage 87 leading from the pump chamber to a point of communication with the outlet passage 67 in the outlet boss 68. The lower end of the pump chamber is closed, and a bottom inlet 89 provided, by an end wall 88 formed of sheet metal and pressed into the cavity defined by the skirt 66 of the casting. This pump structure is more fully described in Patent No. 2,969,741.

The upper end of the pump shaft 82 carries the driven magnet 52 of the magnetic coupling. The upward thrust of the pump shaft 82, produced by the tractive force between the coupling magnets, is taken by a thrust bearing corresponding to that of the pump shaft 42. Such bearing comprises a thrust ball 94 mounted in a cavity 96 in the upper end of the shaft 82 and acting between a thrust face formed by a pad 98 in the bottom of the chamber 96, and a thrust face on a hardened steel disc 99 fixed to the lower face of the laminated wall 20 at the bottom of the motor housing.

The driving and driven members of the magnetic coupling are similar in construction. Each comprises a pressed ferrite magnet 102 having a circular outer periphery and a hexagonal or other noncircular inner periphery. The magnet is seated in a carrier 104 within an outer circular flange and is held in place by an inner retainer ring 106 shaped to fit the inner periphery of the magnet body and to be locked with a press fit on a hub 108 of the carrier 104. The assembled magnetic coupling members 50 and 52 are respectively pressed onto the motor shaft 42 and the pump shaft 82. The magnets are preferably magnetized with a plurality of poles at their opposed faces.

Figure 2:
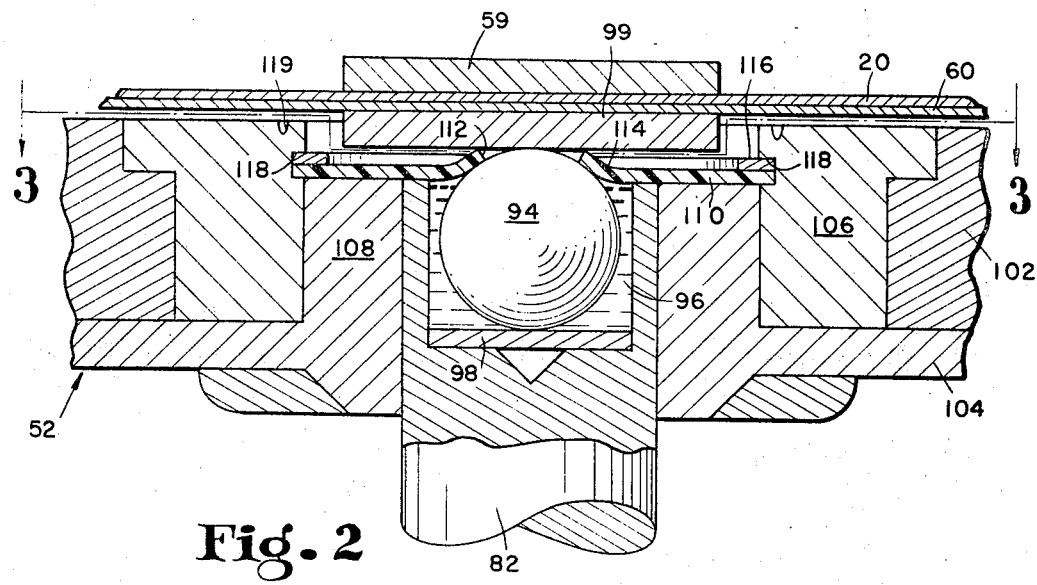
FIG. 2 is an enlarged sectional view of the bearing assembly at the upper end of the pump shaft.
Figure 3:
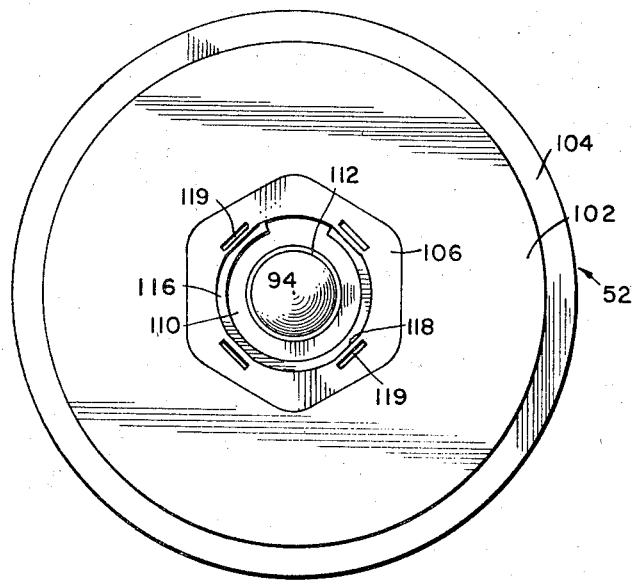
FIG. 3 is an end elevation of the bearing shown in FIG. 2, taken on the line 3—3 of FIG. 2.

The thrust bearing structure and its seal are shown in greater detail in FIGS. 2 and 3. This showing specifically represents the thrust bearing and seal assembly at the top of the pump shaft 82, but also represents the corresponding assembly at the bottom of the motor shaft 42.

The thrust ball 94, acting between the rotating thrust face on the pad 98 and the stationary thrust face on the fixed disc 99 is housed in a bore or chamber 96 in the end of the shaft 82. The ball enclosure might also be formed on the fixed member 99, but the arrangement shown is preferred. The sides of the bore 96 form a retaining wall which holds the ball 94 substantially on the axis of rotation of the shaft, but provides a limited amount of clearance to allow the ball to take a slightly eccentric position. An embodiment as shown in the drawings used a ball having a diameter of .2187 inch in a chamber having a diameter of .250 inch to allow a total diameter clearance of .0313 inch.

The side wall of the chamber 96 extends toward the opposite thrust disc 99 well past the center of the ball 94, and the open end of the chamber is closed by a sealing washer 110.

The sealing washer 110 is in the shape of a circular disc having a central aperture 112 to expose the contact area between the ball 94 and the thrust face on the disc 99. Immediately surrounding such central aperture 112, the washer 110 has an annular shaped section 114 which makes conforming face engagement with the surface of the ball 94. Such shaped annular portion merges at its outer edge with a flat disc portion of the sealing washer 110. The inner periphery of the shaped section 114 of the washer lies between the ball 94 and the thrust face on the disc 99, in the inwardly-converging annular space about the point of contact of those two parts.

The washer 110 extends outward into close proximity with the inner wall of the magnet retainer 106 and is held in place and against the end face of the hub 108 of the magnet carrier, by a snap ring 116 which overlies the edge of the washer 110 and snaps under shoulders 118 formed on the retainer 106. The shoulders 118 may be a continuous circumferential shoulder, or may be a series of retaining lugs. In a preferred embodiment, the snap ring 116 is retained by a series of lugs 118 formed by displacing metal from the retainer 106 inwardly over the snap ring 116 by a staking operation, as evidenced by the small depressions 119 left by the staking.

For use, the chamber 96 is filled with a lubricant. While any of various lubricants may be used, we have found it advantageous to use a lubricant grease which is commercially available from Electrofilm Inc. under the trade identification "Electro-Film 11," which we understand consists of a diester synthetic lubricating liquid, an inorganic thickening agent, inhibitors, and 5% molybdenum disulfide. We prefer to use a lubricant which contains molybdenum disulfide or an equivalent material which, in use, "plates" a lubricating coating on the wear surfaces that will maintain lubrication long after the original supply of grease has been dissipated.

In operation, the sealing washer 110 retains the grease in the ball compartment 96, prevents the escape of lubricant from that compartment, and prevents the entrance of the surrounding fluid into that compartment. The outer face of the sealing washer 110 is exposed to the liquid being pumped, but the annular shaped portion of the washer extends into close proximity with the thrust face of the disc 99 to limit access of the liquid to the contact area between the ball 94 and the disc 99. The inner surface of the sealing washer has a wiping action on the ball 94 which limits the amount of lubricant carried from the chamber 96 to the contact area. With a lubricant containing molybdenum disulfide in suspension, the wiping action of the sealing washer tends to retain the molybdenum disulfide particles within the chamber 96 and to coat a thin film of such molybdenum disulfide on the surface of the ball 94. This has the effect, over a period of use, of coating or plating the surface of the ball 94 and of the thrust faces with a surface coating of molybdenum disulfide which will serve as a lubricant long after all the original grease in the chamber 96 has been consumed or lost.

The action of the sealing washer, thus, is to retain and protect the original grease in the chamber 96 over a considerable period of operation, long enough for the parts to become coated with a longer-lasting coating of molybdenum disulfide, and this provides a prolonged bearing life.

The sealing washer may be made of any of a number of materials, of either natural or synthetic origin, for example, leather, grease-resistant rubber, synthetic sheeting, etc. Preferably, we use a synthetic resin, such as nylon, and most desirably a fluorinated ethylenepropylene synthetic resin such as that available under the trademark "Teflon."

A corresponding structure and operation is present in the thrust bearing 54–59 at the bottom of the motor shaft 42. While this structure is not exposed to the gasoline or other solvent fuel, it is subjected to other unfavorable conditions. The grease chamber 56 opens downward, and the location and environment of the bearing subjects it to heating. The elevated temperature and the relative rotation tend to drain and carry away the grease from the bearing areas. The washer 110 which closes the lower end of the chamber 56 retains the grease and distributes the molybdenum sulfide over the bearing surfaces in the same manner as described above for the bearing 94–99.

The structure shown in the drawing and described above constitutes a preferred embodiment of the invention. We do not desire nor intend that our patent protection be limited to that preferred embodiment, but that it be construed to fairly protect our contribution to the art.

We claim as our invention:

1. A thrust bearing assembly, comprising:
   a thrust reaction member,
   a rotor rotatable on an axis and subject to thrust toward said member,
   thrust faces on said rotor and member lying transversely of said axis in spaced opposed relation along the axis,
   a thrust ball disposed in thrust-bearing relation between said thrust faces, substantially on said axis,
   means forming a lubricant chamber containing a lubricant about said ball, open at one end toward one of said thrust faces,
   a sealing wall of flexible material closing the open end of said chamber and having a central aperture through which the ball makes bearing contact with one of the thrust faces, the edges of said aperture lying between the inward-converging surfaces of the ball and thrust face surrounding the contact area therebetween.

2. A thrust bearing assembly as defined in claim 1 in which said flexible sealing wall has an annular portion surrounding said aperture which is shaped to make substantially conforming face-engagement with an area of the ball around said bearing contact area.

3. A thrust bearing assembly as defined in claim 1, in which said ball is radially confined by a surface of rotation about said axis which permits the ball to take a position of limited eccentricity relative to said axis.

4. A thrust bearing assembly as defined in claim 3, in which said ball is mounted in the end of the rotor and said lubricant chamber is defined in the rotor by means including said surface of rotation, said rotor thrust face and said sealing wall.

5. A thrust bearing assembly as defined in claim 1, in which said lubricant chamber contains a lubricant mixture containing a minor proportion of molybdenum disulfide in suspension in a lubricating base, said flexible sealing wall serving to wipe the molybdenum disulfide particles over the surface of the ball during operation, to produce a plating of molybdenum disulfide on the bearing surfaces.

6. A thrust bearing assembly as defined in claim 3, in which said lubricant chamber contains a lubricant mixture containing a minor proportion of molybdenum disulfide in suspension in a lubricating base, said flexible sealing wall serving to wipe the molybdenum disulfide particles over the surface of the ball during operation, to produce a plating of molybdenum disulfide on the bearing surfaces.

7. In combination with a magnetic coupling having a pair of permanent multipole ring magnets magnetically coupled through an intervening nonmagnetic wall and adapted for operation with the magnet on one side of said wall exposed to the presence of a solvent,
   thrust bearing means for sustaining the tractive force between the magnets, comprising:
      a thrust bearing assembly as defined in claim 1 on such solvent exposed side of said wall,
      wherein the thrust reaction member is carried by said intervening wall,
      said rotor carries said solvent-exposed ring magnet in encircling relation about the thrust ball,
      and the lubricant chamber is formed in the rotor inside such ring magnet.

References Cited

UNITED STATES PATENTS

| | | | |
|---|---|---|---|
| 931,069 | 8/1909 | Larrabee | 308—230 |
| 2,634,177 | 4/1953 | Guibert | 308—230 X |
| 3,132,904 | 5/1964 | Wakamatsu et al. | 308—227 X |

MARTIN P. SCHWADRON, *Primary Examiner.*

CARROLL B. DORITY, *Assistant Examiner.*